United States Patent [19]

Englehardt et al.

[11] Patent Number: 4,669,940

[45] Date of Patent: Jun. 2, 1987

[54] APPARATUS FOR HANDLING REFUSE CONTAINERS AND THE LIKE

[75] Inventors: Raymond R. Englehardt; Franklin D. Ebeling, both of Plainview, Tex.

[73] Assignee: Emco Industries, Inc., Tex.

[21] Appl. No.: 613,090

[22] Filed: May 22, 1984

[51] Int. Cl.⁴ .......................... B65F 3/02; B65G 67/04

[52] U.S. Cl. .................................... 414/303; 294/106; 414/409; 414/422; 414/555

[58] Field of Search ............... 414/406, 408, 409, 422, 414/555, 303; 294/106

[56] References Cited

U.S. PATENT DOCUMENTS

| | | | |
|---|---|---|---|
| Re. 29,235 | 5/1977 | Kurelek | 414/555 X |
| 3,371,952 | 3/1968 | Hunger | 294/106 X |
| 3,620,561 | 11/1971 | Grotkasten et al. | 294/106 |
| 3,841,508 | 10/1974 | Ebeling et al. | 414/406 |
| 4,049,043 | 9/1977 | Fort et al. | 294/106 X |
| 4,219,298 | 8/1980 | Stragier et al. | 414/409 |
| 4,227,849 | 10/1980 | Worthington | 414/408 |
| 4,401,407 | 8/1983 | Breckenridge | 414/408 |
| 4,427,333 | 1/1984 | Ebeling | 414/422 X |
| 4,478,451 | 10/1984 | Brucher et al. | 294/106 |

FOREIGN PATENT DOCUMENTS

| | | | |
|---|---|---|---|
| 620025 | 10/1935 | Fed. Rep. of Germany | 294/106 |
| 64362 | 6/1978 | Japan | 294/106 |
| 592738 | 2/1978 | U.S.S.R. | 294/106 |
| 757138 | 9/1980 | U.S.S.R. | 294/106 |
| 963850 | 10/1982 | U.S.S.R. | 294/106 |
| 965764 | 10/1982 | U.S.S.R. | 294/106 |

*Primary Examiner*—Robert J. Spar
*Assistant Examiner*—Stuart J. Millman
*Attorney, Agent, or Firm*—Hubbard, Thurman, Turner & Tucker

[57] ABSTRACT

A container handling apparatus for refuse containers of various sizes includes a frame mounted on an elevating and dumping mechanism disposed on a refuse collection vehicle. The apparatus includes opposed primary container engaging arms pivotally secured to the frame and secondary container engaging arms pivotally secured to the frame inboard of the pivot points of the primary arms. Hydraulic cylinder actuators are operable to move the primary arms from a retracted position substantially within the normal clearance width profile of the vehicle to a position for engaging and gathering the container to be grasped between the primary and secondary arms. The configuration of the primary and secondary arms provides for grasping containers of various diameters and for tolerating misalignment of the apparatus with respect to a container during driveby pickup operations. Alternate embodiments of the apparatus include opposed primary arms and a transversely extendable and retractable container engaging member to provide three point contact with the container. A second alternate embodiment includes two opposed primary arms which overlap each other to grasp containers of various sizes between the arms and the frame.

14 Claims, 9 Drawing Figures

APPARATUS FOR HANDLING REFUSE CONTAINERS AND THE LIKE

BACKGROUND OF THE INVENTION

1. Field of the Invention

The present invention pertains to an apparatus for mounting on a refuse collection vehicle and including a pair of opposed hydraulically actuated arms adapted to grasp refuse containers of various sizes, elevate and dump the containers and return the containers to a curbside position.

2. Background

The automation of refuse collection and the development of equipment for handling containers for such operations has presented certain problems in the provision of a compact apparatus which may be conveniently mounted on an over-the-road refuse collection vehicle and in the development of apparatus which can automatically pickup, dump and return refuse containers of various sizes.

In apparatus used for pickup of refuse in residential and commercial neighborhoods, for example, containers of various sizes are typically set adjacent to an alley or a street curb for pickup by the collection vehicle. However, one problem associated with picking up containers in such locations pertains to the requirements of positioning the vehicle in an exact position relative to the container so that remote control apparatus may be operated to grasp the container, elevate the container into a dumping position for dumping the refuse into a collection hopper or compactor and returning the container to a curbside or alleyside position. In this regard it is also important that the apparatus, when mounted on an over-the-road vehicle, be capable of being retracted into a position on the vehicle which eliminates any laterally projecting structure which extends beyond the nominal vehicle clearance width.

Moreover, in many applications of refuse collection equipment it is highly desirable to be able to provide container pickup apparatus which is adapted for picking up containers of various sizes and for accommodating a margin of error in locating the vehicle with respect to the container as the driver approaches and positions the vehicle for operation of the container pickup apparatus. The present invention provides an improved remotely operable refuse container handling apparatus which overcomes several problems as will be appreciated by those skilled in the art.

SUMMARY OF THE INVENTION

The present invention provides an improved refuse container handling and dumping apparatus which is particularly adapted for mounting on a transport vehicle for picking up, dumping and returning refuse collection containers of various sizes to curbside and other stationary positions.

In accordance with one aspect of the present invention there is provided a refuse container handling and pickup apparatus comprising a pair of opposed arms mounted on a frame which is adapted for support by a mast assembly and wherein the arms may be moved from a retracted position substantially within the normal clearance width profile of a transport vehicle to a position for grasping and picking up refuse containers of various sizes and returning the containers to their original position after dumping the container contents. The apparatus is further characterized by an arrangement of opposed arms which are capable of grasping containers of various sizes at three or more points on the container periphery to provide for more secure engagement with the container during container handling operation. The container grasping arms are preferably actuated by opposed hydraulic cylinders for movement from a retracted position lying substantially flat with a very limited lateral profile to a position wherein the arms are moved toward each other to grasp a container tightly for lifting the container to a container dumping position.

The apparatus also preferably includes a pair of opposed primary arms which are directly connected to the hydraulic cylinders and a pair of secondary or inner arms which are mounted for pivotal movement about respective pivot axes positioned between the pivot axes of the primary arms to provide additional points of engagement of the container as the arms are moved into the container grasping position. The apparatus provides a unique arrangement of the primary and secondary arms whereby the secondary arms are moved toward the container engaging position by the primary arms and are moved to a retracted position by yieldable biasing mechanisms such as springs.

In accordance with another aspect of the invention a refuse container pickup and handling apparatus is provided which does not require precise positioning of a collection vehicle on which the apparatus is mounted with respect to the container prior to actuation of the apparatus. The provision of a pair of relatively widely spaced primary container grasping arms together with secondary container engaging means increases the reach of the apparatus even when the vehicle on which the apparatus is mounted is not positioned accurately for engagement of the container. The primary container grasping arms are advantageously provided with rollers supported on the distal ends of each of the arms for gathering and guiding the container into a position wherein both arms can grip the container between the arms and secondary container engaging structure.

In accordance with yet a further aspect of the present invention the container handling apparatus is advantageously used in conjunction with a remotely controllable mast assembly which is laterally movable relative to the collection vehicle and includes an elevating mechanism for moving the container from its pickup position to a position for dumping the container contents into a hopper or compactor and returning the container to its initial position.

Those skilled in the art will further appreciate the abovementioned aspects of the invention as well as additional superior features thereof upon reading the detailed description which follows in conjunction with the drawing.

DESCRIPTION OF THE PREFERRED EMBODIMENTS

Figure 1:
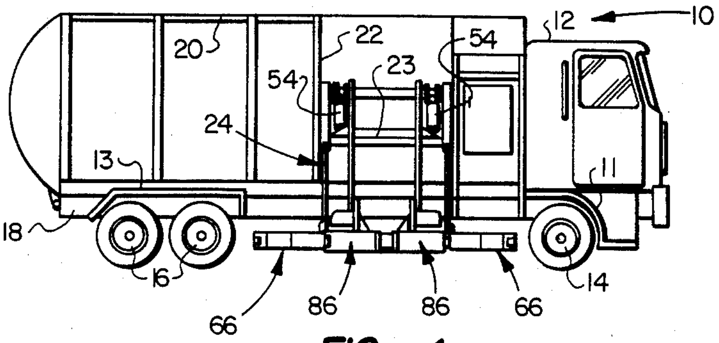
FIG. 1 is a side elevation view of a refuse collection vehicle including the container handling apparatus of the present invention.

In the description which follows like parts are marked throughout the specification and drawing with the same reference numerals, respectively. The drawing figures are not necessarily to scale and certain features of the invention may be shown exaggerated in scale or in schematic form in the interest of clarity.

Referring to FIG. 1, the container handling apparatus of the present invention is particularly advantageously used in conjunction with a motorized refuse collection vehicle, generally designated by the numeral 10. The vehicle 10 typically comprises an over-the-road motor truck having an operator's cab 12 a conventional front steering wheel and axle assembly 14 and tandem rear deive axle and wheel assemblies 16 supporting a frame 18. The frame 18 supports a refuse collection hopper 20 which may include a suitable compaction mechanism, not shown. The hopper 20 includes an opening 22 formed in a sidewall 23 of the hopper for receiving refuse. The vehicle 12 is of a type typically used for the collection of refuse from residential and commercial areas wherein individual containers are set at the street curb, and adjacent to alleyways or driveways for collection. The containers are typically cylindrical open top metal or plastic cans and are also usually of varying sizes and diameters.

Figure 2:
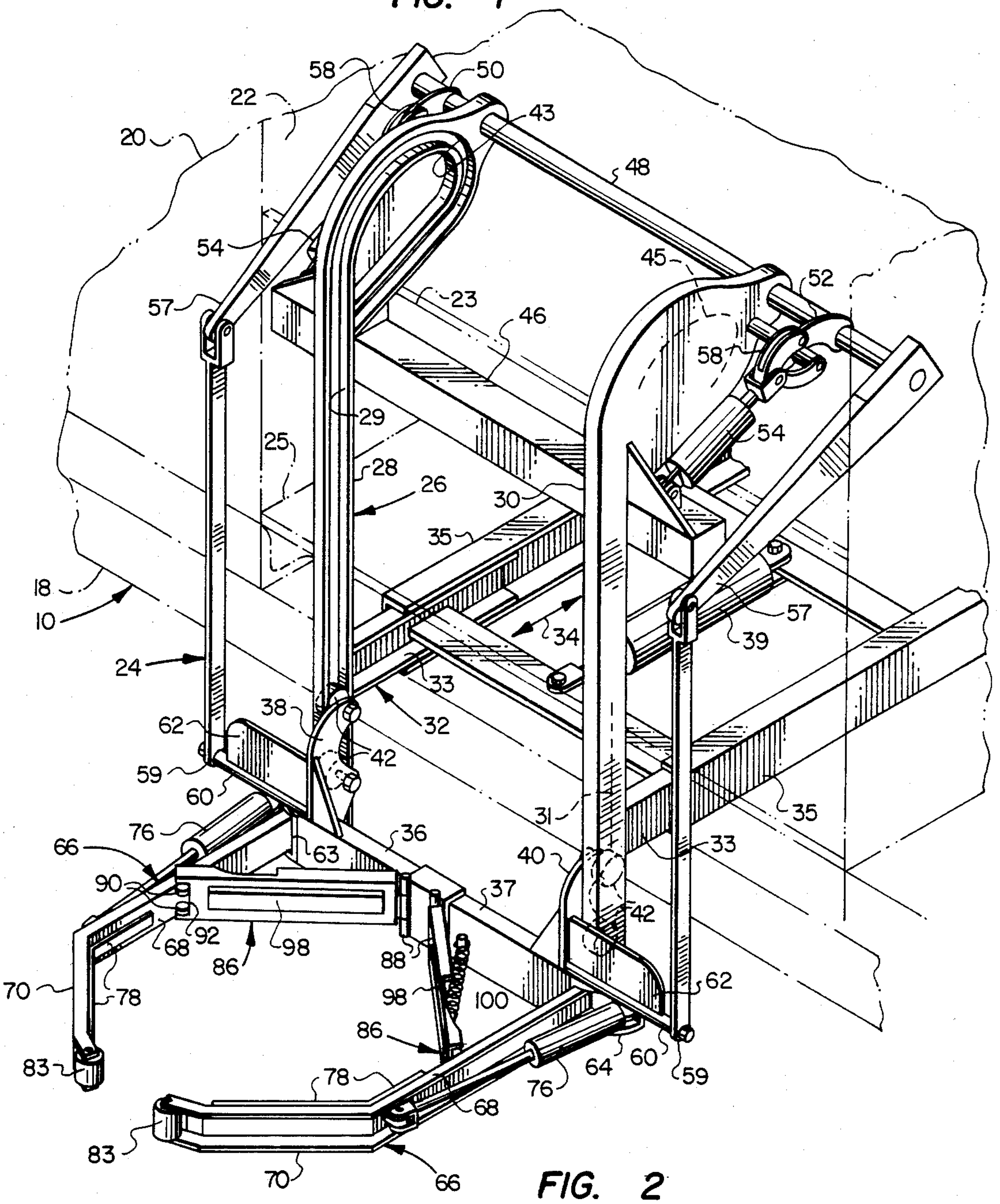
FIG. 2 is a perspective view of the container handling apparatus with the opposed container grasping arms in a partially closed position.

Referring also to FIG. 2, the vehicle 10 is adapted to support the improved container handling apparatus of the present invention, which is generally designated by the numeral 24. The apparatus 24 is mounted on a container elevating and dumping mechanism 26 comprising a mast assembly formed by two spaced apart mast members 28 and 30 forming opposed guide channels 29 and 31 to be described further herein. The mast members 28 and 30 are mounted on a support frame 32 which is slidably mounted on the frame 18 beneath hopper floor 25 for movement laterally with respect to the frame 18 in opposite directions as indicated generally by the arrow 34 in FIG. 2. The frame 32 typically includes spaced apart channel members 33 which are slidable in opposed channel members 35 supported on frame 18. A hydraulic cylinder type actuator 39 is operable to move the frame 32 and apparatus 24 laterally relative to the vehicle 10. The frame 32 and the mechanism for moving the frame laterally with respect to the vehicle frame 18 is preferably of a type such as disclosed in U.S. Pat. Nos. 3,910,434 and 4,090,626 to Ebeling, et al and reference may be made to the patents for a further understanding of the construction and operation of the structure.

Referring further to FIG. 2, the container handling apparatus 24 includes a frame member 36 having a pair of spaced apart upstanding brackets 38 and 40 which support respective pairs of rollers 42. The rollers 42 are disposed in the opposed guide channels 29 and 31 formed in the respective mast members 28 and 30 for guiding the frame 36 for movement along the mast members from a container pickup position as shown in FIG. 1 to a container dumping position as the rollers traverse the curved channel portions 43 and 45. The mast members 28 and 30 are interconnected by a member 46 and are also supportive of a shaft 48 rotatably mounted on the mast members and connected to opposed crank arms 50 and 52. The crank arms 50 and 52 are suitably connected to a pair of spaced apart hydraulic cylinder and piston type actuators 54 which are interconnected between the shaft 48 and the member 46 for rotating the shaft 48 about its longitudinal axis. The crank arms 50 and 52 are each connected at their distal ends to linkage 58 which in turn is connected to the respective cylinders 54. The shaft 48, crank arms 50 and 52, actuating cylinders 54 and linkages 58 are similar to the mechanism described in U.S. Pat. No. 4,427,333 to Franklin Ebeling and reference may be made to the patent for a further understanding, if necessary, of the mechanism. The shaft 48 is also connected to opposed articulated arms 57 which are secured for rotation with the shaft. The arms 57 are each pivotally connected at their lower ends 59 to opposed trunnions 60 on the frame member 36. Accordingly, in response to actuation of the cylinder actuators 54, the shaft 48 is rotatable about its longitudinal axis to elevate the container handling apparatus 24 along the mast members 28 and 30 and along a generally arcuate path at the top of the respective mast members to turn a container supported by the apparatus 24 upside down to dump the contents thereof into the hopper 20 through the opening 22. The general operation of the elevating and dumping mechanism 26 may be better understood, if required, by reference to U.S. Pat. No. 4,427,333. Alternatively, the elevating mechanism for the container handling apparatus may take the form of that described in U.S. Pat. Nos. 3,910,434 and 4,090,626.

Figures 3, 4, 5, 6:
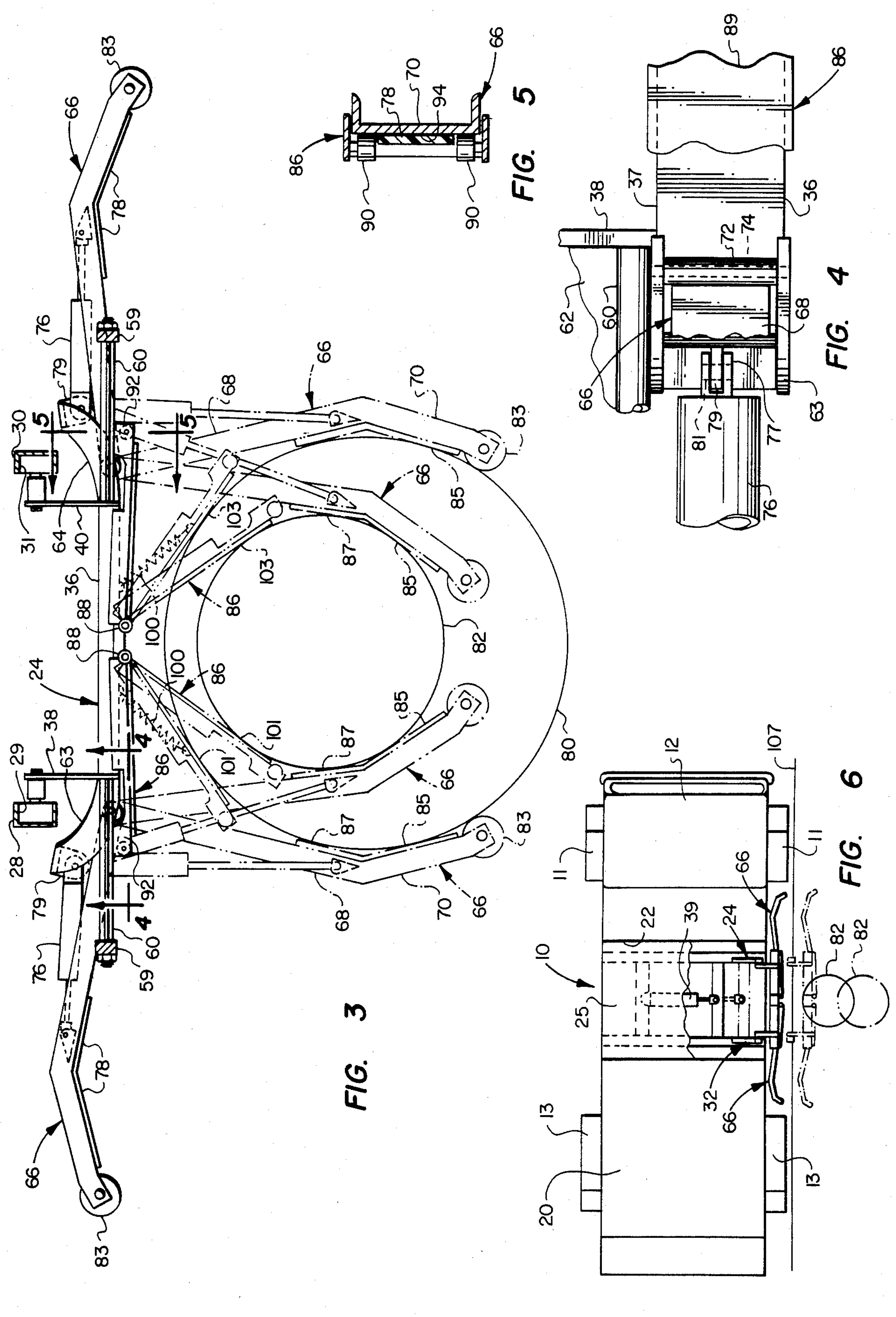
FIG. 3 is a detail plan view of the container handling apparatus.
FIG. 4 is a detail view taken from the line 4—4 of FIG. 3.
FIG. 5 is a detail section view taken along line 5—5 of FIG. 3.
FIG. 6 is a plan view of the refuse collection vehicle parked at curbside for pickup of a container.

Referring further to FIG. 2 and also FIG. 3, the trunnions 60 are suitably secured to the frame 36 including the support brackets 38 and 40 by respective gussets 62. The frame 36 preferably comprises an elongated channel section member 37 which is secured at its opposite ends to respective support brackets 63 and 64 which are adapted to pivotally support a pair of opposed primary container grasping arms 66. The arms 66 include integral segments 68 and 70 which are formed to extend at a relatively shallow angle with respect to each other. As shown by way of example in FIG. 4, each arm segment 68 includes a boss 72 formed on one end which is adapted to support the arm for pivotal movement on the respective brackets 63 or 64 about respective pivot pins 74. The bracket 64 is arranged in mirror image relationship to bracket 63 and supports the other arm 66 in an identical manner. Opposed hydraulic cylinder and piston type actuators 76 are pivotally connected to the respective brackets 63 and 64 at one end and to respective ones of the arms 66 at their opposite ends for moving the arms about their pivot axes between a fully retracted position shown in FIG. 3 to selected alternate container grasping positions illustrated, depending on the size of respective containers 80 and 82. Again, as shown by example in FIG. 4, cylinder 76 includes a clevis bracket 77 pivotally connected to a boss 79 by a pivot pin 81.

The arms 66 each also include resilient nonskid pads 78 forming container engaging surfaces on both arm segments 68 and 70. The ends of the arms 66 opposite the bosses 72 are also adapted to support container engaging rollers 83 which assist in gathering a container into a position between the arms 66 when they are moved from a retracted position toward the container grasping position. Thanks to the somewhat bent configuration of the arms 66 formed by the segments 68 and 70 and the rollers 83, a generally cylindrical container may be engaged at spaced apart points on the pads 78 along both of the arms segments 68 and 70 as well as by the rollers 83, depending on the size of the container. For example, as shown in FIG. 3, a relatively large container 80 which also requires greater gripping forces due to the weight of the contents therein may be grasped by the primary arms 66 at points 85 and 87 along the pads 78 and may also be forcibly engaged by the rollers 83.

The apparatus 24 includes secondary container engaging and grasping means providing further points of engagement of the container and characterized by a pair of secondary arms 86 which are each pivotally supported on the frame 36 by suitable hinge means 88. The arms 86 are preferably formed of channel section members 89 which have a web portion of greater width than the width of the channel section 37 and the respective arms 66 whereby at least the channel section 37 may be nested at least partially within the arms 86 in their respective retracted positions. As shown also in FIG. 5, by way of example, each of the arms 86 is provided with a pair of spaced apart rollers 90 rotatably mounted on the distal ends 92 of the arms and adapted to roll along the web surface 94 of the arm segment 70 on opposite sides of the container gripping pads 78. The arms 86 are each also provided with container engaging pads 98 disposed on the arm surfaces facing a container to be gripped by the apparatus 24. The arms 86 are preferably biased into the retracted position shown in FIG. 3 by respective springs 100 which are suitably interconnected between the arms and the frame 36.

As indicated in FIG. 3, regardless of the size of the container to be gripped by the apparatus 24, including the containers 80 or 82, the arms 86 are moved about their respective hinges 88 from the retracted position to a selected container grasping position in conjunction with pivotal movement of the arms 66 to provide spaced apart points of engagement 101 and 103 with the surface of a container. Accordingly, regardless of the size of the container, within the grasping range of the arms 66 and 86, a container is typically engaged at least at four, six or eight circumferentially spaced points of engagement so that the container is firmly grasped by the apparatus 24 for elevation and tipping to dump its contents into the refuse hopper 20.

The particular configuration of the container grasping arms 66 and 86 provides several advantages in a refuse container handling apparatus. As illustrated in FIG. 3, the arms 66 and 86 may be retracted to a position wherein each arm 66 and 86 extends in a direction substantially opposite the other arm of the respective pairs whereby a substantial range of container gathering capability is provided in moving the arms to a container engaging position. Moreover, in the retracted position, all of the arms lie virtually within the envelope of the vehicle 10 see FIG. 6, and do not extend beyond the overall clearance width of the vehicle 10 itself. In this way the vehicle may be positioned closer to a container for pickup, such as the exemplary container 82, than with prior art container handling apparatus.

The configuration of the opposed arms 66 with the container gathering rollers 83 together with the secondary pivoted arms 86 is also particularly tolerant of positioning errors of the vehicle 10 with respect to a container to be picked up by the apparatus 24. The arms 66 and 86 allow a container to be grasped which has not been centered exactly with respect to the pivot axes of the arms 66 and 86 whereby the container may be engaged and centered between the arms as they are moved toward their closed positions without upsetting the container before it is firmly gripped between all four of the arms. Still further, due to the provision of the rollers 83, containers of various sizes may be engaged by the arms 66 and gathered into a gripping position by all four arms more easily than with prior art container handling apparatus. Of course, if necessary, the apparatus 24 may be moved laterally with respect to the vehicle 10 if the container is sitting in a position which does not permit driving the vehicle closely adjacent to the container. In all events the container handling apparatus 24 is very tolerant of positioning of the vehicle with respect to a container to be picked up and is also particularly adapted for handling containers of various sizes. The provision of multiple container engaging surfaces on the arms 66 and further container engaging surfaces on the arms 86 provide for grasping cylindrical containers at as many as eight circumferentially spaced points on the surface of the container to minimize crushing forces on the container while yet providing for a firm grasp.

Referring further to FIG. 6, the front wheel fenders 11, may in fact define the clearance width of the vehicle 10, and the apparatus 24 with its arms 66 and 86 in the retracted position, is disposed within the clearance width W of the vehicle 10 between the front fenders 11 and rear fenders 13. In a typical operating cycle to pickup a container 82 sitting at a curb 107 or adjacent an alleyway, the vehicle 10 is driven alongside the container as close as the clearance width of the vehicle permits and positioned directly adjacent to the container 82 awaiting pickup. Typically, depending on the exact position of the container 82, the frame 32 is not required to be laterally extended with respect to the vehicle 10 and once the vehicle has been stopped generally alongside the container, the cylinder actuators 76 are operated to pivot the arms 66 toward each other to engage the container. As the arms 66 are pivoted toward each other, the arms 86 are automatically closed toward each other since the rollers 90 are continuously engaged with the arm segments 70 in essentially all positions of the arms. The actuators 76 are preferably connected hydraulically in parallel to a suitable control circuit, not shown, whereby equalized closing and container grasping forces are exerted on the arms 66 and 86. When a container 80 or 82 is firmly grasped by the pairs of arms 66 and 86, the actuators 54 are operated to elevate the frame 36 which follows the channels 29 and 31 formed by the mast members 28 and 30 to elevate the container vertically and then tip the container into a generally inverted position to dump the contents into the hopper 20. The actuators 54 are then reversed to position the container upright and lower it to a position whereupon the cylinder actuators 76 are retracted to release engagement of the container by the arms 66 and 86. Since the arms 66 and 86 are retracted clear of the container, regardless of its size, the vehicle 10 may be driven away from the pickup site without accidently engaging and damaging the container. Of course, if container 82 is not sitting close enough to curb 107 prior to pickup the actuator 39 may be energized to extend the apparatus 24 to the alternate position indicated in FIG. 6. The ability of the apparatus 24 to handle various container sizes is particularly useful in refuse collection operations wherein a wide variety of containers are used or, depending on container placement sites, two or more "standard" container sizes are utilized.

Figure 7:
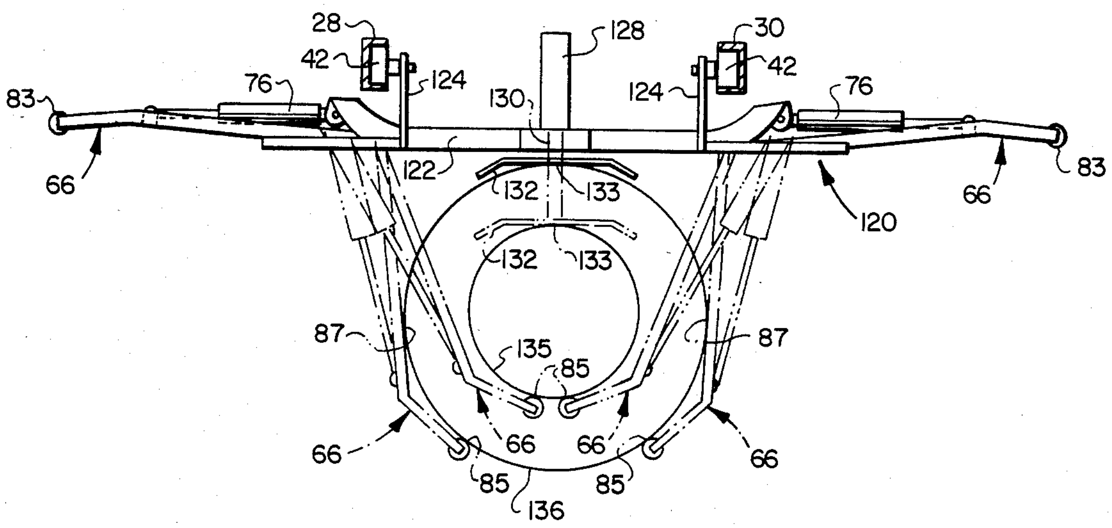
FIG. 7 is a plan view in somewhat schematic form illustrating a first alternate embodiment of the container handling apparatus.

Referring now to FIG. 7, an alternate embodiment of a container handling apparatus is illustrated in somewhat schematic form and generally designated by the numeral 120. The apparatus 120 includes a frame member 122 having spaced apart roller support brackets 124 for supporting rollers 42 in the mast members 28 and 30, respectively. The frame member 122 is similar in some respects to the frame member 36 but is adapted to support a hydraulic cylinder actuator 128 having an extensible piston rod 130 which supports a container engaging member 132. Opposed arms 66 are supported on the frame 122 and are movable between retracted positions and container engaging positions by hydraulic cylinder actuators 76. The apparatus 120 is operable to engage and grasp containers 135 or 136 of different diameters by swinging the arms 66 into container engaging positions indicated by the alternate position lines in FIG. 7 and by extending the piston rod 130 as required to engage the container with the member 132. Accordingly, container engaging points 85 or 85 and 87 are provided on arms 66 and a further container engaging point 133 is provided by member 132. The arms 66 provide the same gathering and centering function for locating a container 135 or 136 relative to the frame 122 as in the arrangement of the apparatus 24, due at least in part to the rollers 83.

Figure 8:
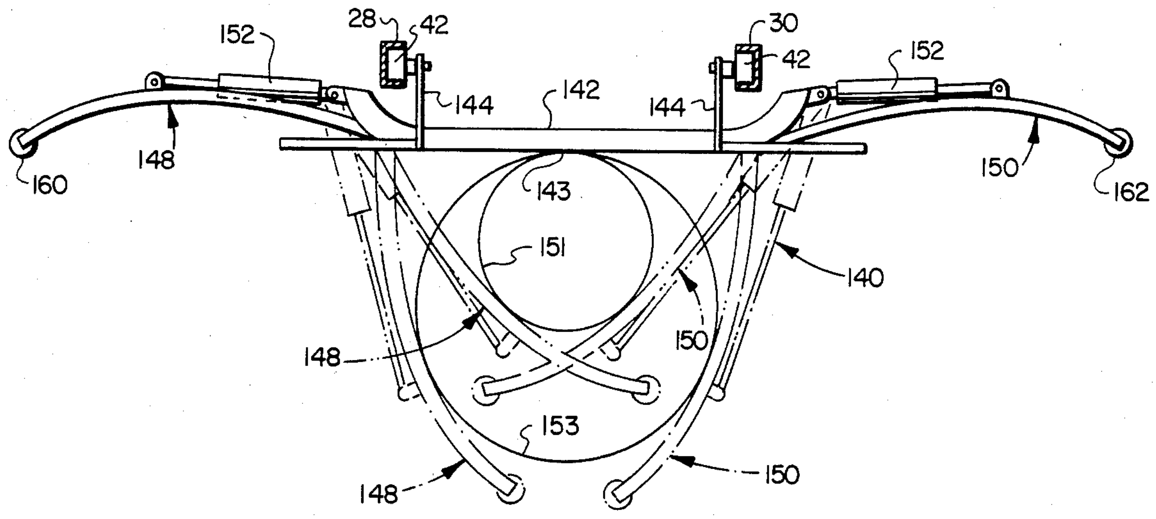
FIG. 8 is a plan view in somewhat schematic form of a second alternate embodiment of the container handling apparatus.
Figure 9:
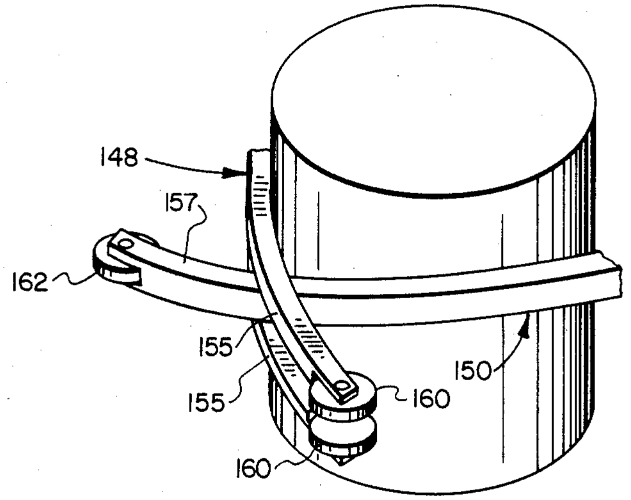
FIG. 9 is a detail perspective view showing the configuration of the arms of the second alternate embodiment.

Referring now to FIGS. 8 and 9, a second alternate embodiment of an apparatus in accordance with the present invention is indicated somewhat schematically and generally designated by the numeral 140. The apparatus 140 includes a frame member 142 similar to the frame member 36 and provided with spaced apart brackets 144 for supporting rollers for traversal in the mast members 28 and 30, respectively. A pair of opposed container grasping arms 148 and 150 are pivotally supported spaced apart on the frame member 142 and are movable about their respective pivot axes by hydraulic cylinder actuators 152 interconnected between the respective arms and the frame 142. The frame 142 includes a fixed third engaging surface 143 which is cooperable with the arms 148 and 150 to engage and grasp containers 151 and 153 of different diameters. As indicated in FIG. 9, the arm 148 is bifurcated to provide opposed co-extensive arm portions 155 between which the distal end 157 of arm 150 may extend so that the arms 148 and 150 may overlap to grasp containers of various sizes as indicated by the alternate positions of the arms 148 and 150 in FIG. 8. The respective arm portions 155 are supportive of rollers 160 at their outer ends and the arm portion 157 also supports a roller 162 at its distal end for assistance in engaging and gathering a container within the grasp of the arms. As with the embodiment illustrated in FIGS. 1 through 6, the embodiments of the container handling apparatus described in conjunction with FIGS. 7 through 9 are also adapted to move the respective pivoting arms between a position wherein they do not extend beyond the width of the refuse collection vehicle to a position wherein they are engageable with a container sitting adjacent to the respective apparatus 120 or 140.

Although preferred embodiments of the invention have been described herein in detail those skilled in the art will recognize that various substitutions and modifications may be made to the embodiments shown and described without departing from the scope and spirit of the invention as recited in the appended claims.

What is claimed is:

1. Apparatus for handling refuse containers and the like of various cross-sectional dimensions for grasping, elevating and tipping said containers to discharge the contents of said containers, said apparatus comprising:

a frame;

a first pair of rigid arms mounted spaced apart on said frame for pivotal movement at said frame between a retracted position and a container grasping position, said first pair of rigid arms including means forming container engaging surfaces on respective ones of said first pair of rigid arms;

means for actuating said first pair of rigid arms to move said first pair of rigid arms between said positions; and means supported on said frame between said first pair of rigid arms forming another container engaging surface and cooperable with said first pair of rigid arms for holding said container, and being movable away from said frame to engage and support said container as said container is biased toward said frame by said first pair of rigid arms;

said means forming said another container engaging surface comprises a second pair of arms mounted spaced apart on said frame for pivotal movement between a retracted position and a container grasping position in conjunction with said first pair of rigid arms, each of said second pair disposed along an inner surface of a corresponding one of said first pair of rigid arms for engaging said container by moving away from said frame as said container is biased toward said frame by said first pair of rigid arms.

2. The apparatus set forth in claim 1 wherein:

each arm of said second pair of arms includes at least one container engaging surface formed thereon, and said second pair of arms is mounted on said frame for pivotal movement to substantially center said container laterally relative to said first pair of rigid arms in response to movement of said first pair of rigid arms toward a container grasping position.

3. The apparatus set forth in claim 1 wherein:

said arms of said second pair of arms are pivotally mounted on said frame between said first pair of rigid arms, and each of said arms of said second pair of arms is slideably engageable with a corresponding arm of said first pair of rigid arms for movement with said first pair of rigid arms toward said container grasping position.

4. The apparatus set forth in claim 3 including: means for yieldably biasing said second pair of arms toward said retracted position.

5. The apparatus set forth in claim 1 wherein: said means for actuating said first pair of rigid arms for movement between said positions comprises respective hydraulic cylinder actuators connected to said frame and respective ones of said first pair of rigid arms.

6. The apparatus set forth in claim 1 wherein: each of said arms of said first pair of rigid arms includes at least a first segment pivotally supported on said frame and a second segment extending from said first segment and non-linear with said first segment to form generally opposed container engaging surfaces with respect to container engaging surfaces formed on each of said first segments.

7. The apparatus set forth in claim 6 wherein: the distal ends of said second segments each include roller means mounted thereon and operable to engage a container during movement of said first pair of rigid arms toward the container grasping position for urging said container to a position between said arms.

8. The apparatus set forth in claim 1 including: elevating means for supporting said frame on a vehicle for movement of said container to and from a position to discharge the contents of said container and whereby said apparatus is supported on the vehicle such that in the retracted position of said arms said apparatus does not extend laterally substantially beyond the clearance width of the vehicle.

9. The apparatus set forth in claim 8 wherein: said means for supporting said frame includes actuator means for moving said apparatus laterally with respect to said vehicle to and from a container grasping position.

10. The apparatus set forth in claim 1 wherein: said arms of said first pair of rigid arms are constructed so as to overlap each other in said container grasping position to grasp said container between said container engaging surfaces, respectively.

11. Apparatus for handling a refuse container and the like comprising:

a frame;

means for supporting said frame on a refuse collection vehicle;

opposed first and second arms pivotally mounted at one end, respectively, on said frame and spaced apart one from the other for pivotal movement between an open retracted position and a container grasping position, each of said arms including a container engaging surface formed thereon;

actuator means for moving said arms between said positions;

roller means mounted on the distal ends of each of said arms opposite said one end for engaging a container to gather said container into a position to be grasped by said engaging surfaces on said arms; and means forming at least a third container engaging surface for engaging a container to grasp said container between said arms, said means forming at least a third container engaging surface being rollably extensible away from said frame to engage said container including third and fourth arms mounted on the frame for pivotal movement between said first and second arms.

12. The apparatus according to claim 11 wherein: said third and fourth arms are slideably engageable respectively with said first and second arms by roller tracking means for movement with said first and second arms toward said container grasping position.

13. The apparatus set forth in claim 11 wherein: each of said first and second arms includes at least a first segment pivotally supported on said frame and a second segment extending from said first segment and non-linear with said first segment to form generally opposed container engaging surfaces with respect to container engaging surfaces on each of said first segments.

14. Apparatus for handling refuse containers and the like of various cross-sectional dimensions for grasping, elevating and tipping said containers to discharge the contents of said containers, said apparatus comprising:

a frame;

a first pair of arms mounted spaced apart on said frame for pivotal movement between a retracted position and a container grasping position, said first pair of arms including means forming container engaging surfaces on respective ones of said arms;

means for actuating said first pair of arms to move said first pair of arms between said positions;

means supported on said frame and forming another container engaging surface and cooperable with said first pair of arms for holding said container for movement of said container to discharge the contents thereof;

said means forming said another container engaging surface including a second pair of arms mounted spaced apart on said frame for pivotal movement between a retracted position and a container grasping position in conjunction with said first pair of arms;

said arms of said second pair of arms pivotally mounted on said frame between said first pair of arms, and each of said arms of said second pair of arms engageable with a corresponding arm of said first pair of arms for movement with said first pair of arms toward said container grasping position; and said arms of said second pair of arms further including channel section members pivotally mounted on said frame and movable to a retracted position wherein a portion of said frame is nested in said arms of said second pair of arms.

* * * * *